Patented June 16, 1942

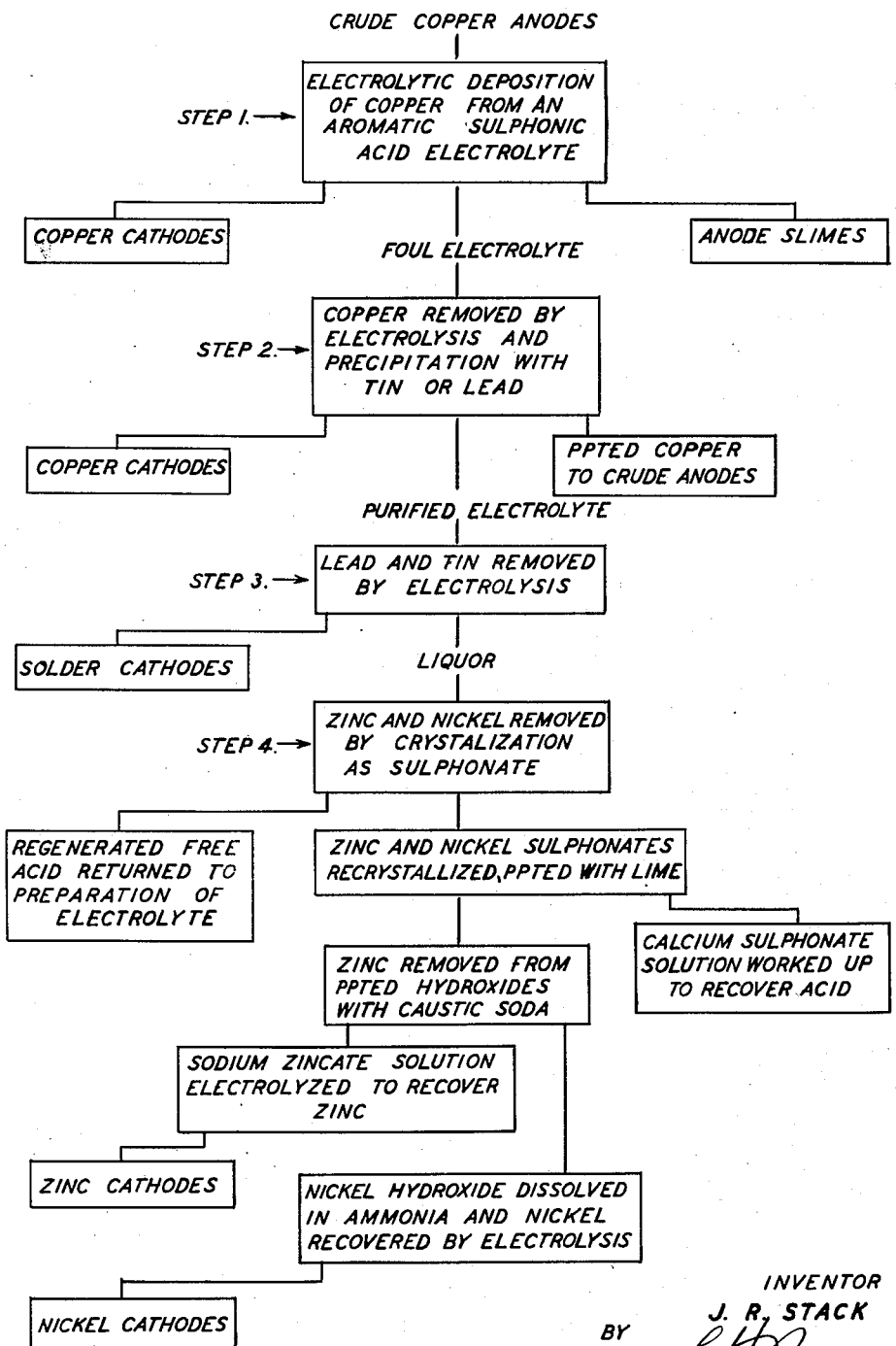

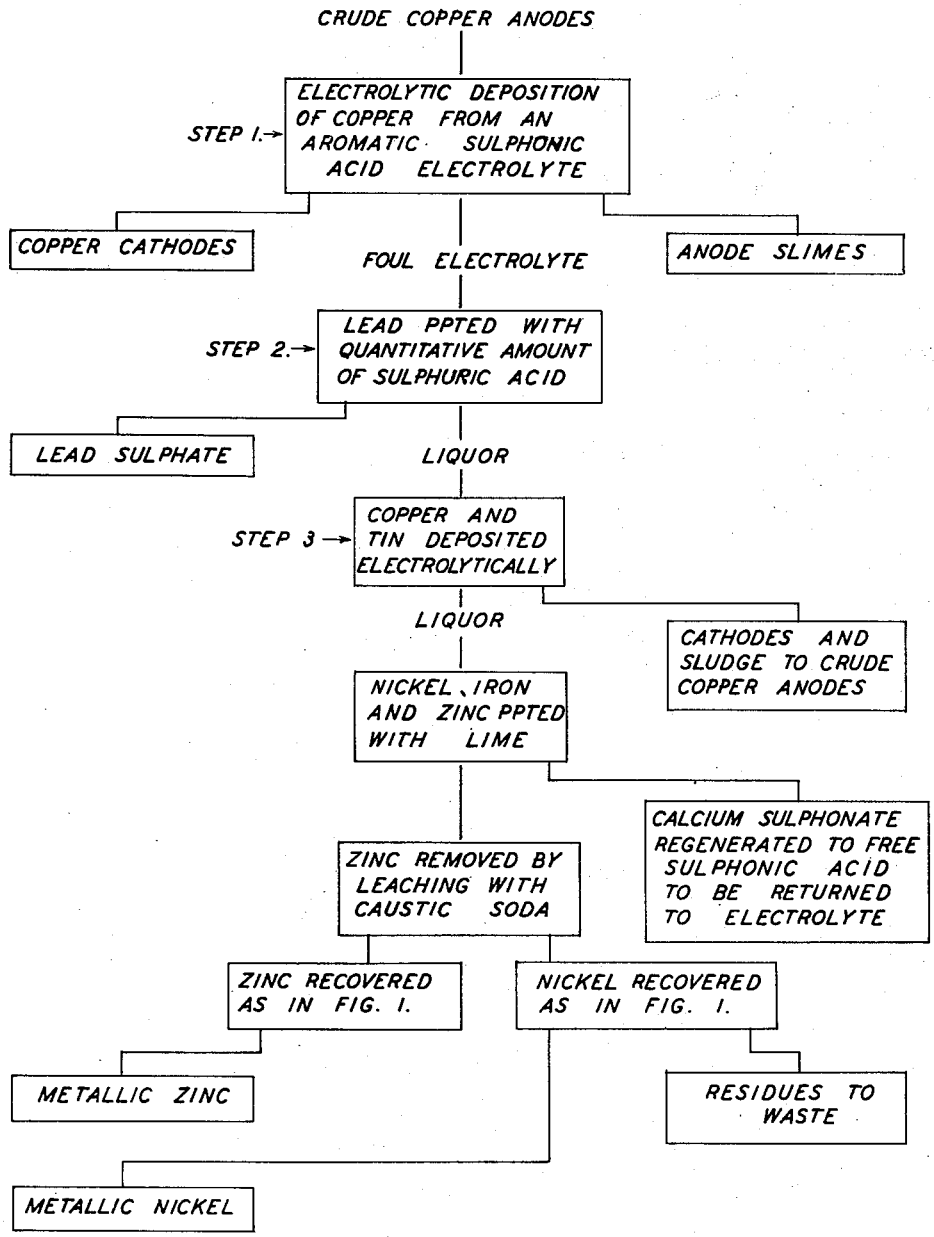

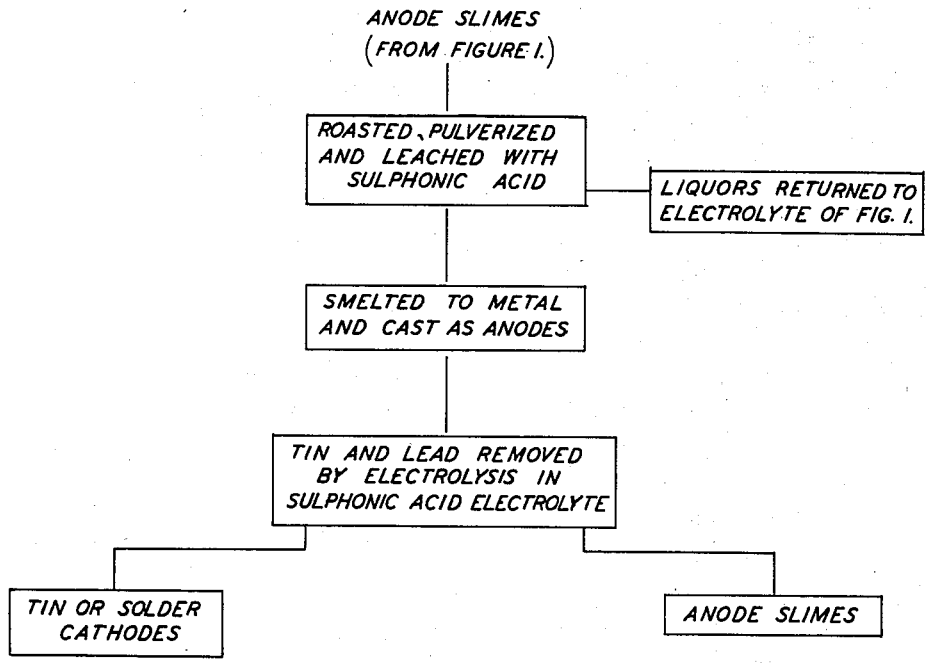

2,286,240

UNITED STATES PATENT OFFICE 2,286,240

REFINING OF NONFERROUS METALS

James R. Stack, Staten Island, N. Y., assignor to Nassau Smelting & Refining Company, Incorporated, New York, N. Y., a corporation of New York Application March 21, 1938, Serial No. 197,209

19 Claims. (Cl. 204—106)

This invention relates to the refining of nonferrous metals and more particularly to the refinishing of copper bearing materials.

Considerable quantities of scrap materials containing substantial amounts of copper and lesser amounts of tin, lead, zinc, iron and other metals are obtained from discarded materials, such as used telephone and other electrical equipment, machine shop turnings, refinery and foundry scraps and materials from various other sources. Efforts have been made heretofore to refine these low grade materials to obtain the constituent metals therefrom in usable forms.

In one process which has been used heretofore, the impure material is charged into a blast furnace and smelted to remove the major portion of the iron. The metal obtained from the blast furnace is transferred to a converter and substantially all of the lead, zinc and tin are removed by blowing with air. In some instances copper matte or leady copper matte is added to the converter charge to assist in the removal of lead and tin. The resulting fumes are collected in a bag house in the form of a dust or fume and the latter material is treated to separate the metals or compounds contained therein. The remaining metal is transferred to a reverberatory furnace and is further refined by blowing and poling, after which it is cast into anodes which are electrolytically refined in a standard sulphuric acid electrolyte. The principal objections to this process are that the metal must be carried through a number of refining steps in order to obtain pure copper and the bag house dust or fume containing the lead, tin and zinc is difficult to treat to recover the constituent metals.

In another process which has been practiced previously, the scrap material is treated in a blast furnace to eliminate the iron and the resultant molten metal is charged into a converter where substantially all of the zinc only is removed by blowing with air. The metal from the converter is cast into anodes and is electrolyzed for the production of copper in a sulphuric acid electrolyte of relatively low concentration. During the electrolysis most of the metals other than copper, such as lead and tin, are converted into insoluble compounds, and some of these compounds adhere to the anodes, some remain suspended in the electrolyte and the balance fall to the bottom of the electrolytic cell in the form of anode slimes. Any dissolved antimony is rendered insoluble as an oxychloride by the presence of chlorine ions, previously added to the solution, or by other known means. The anode slimes produced are treated to recover the metallic values therein. Among the objections to this process are the high cost of the electrolytic refining due to the abnormally high cell voltage necessitated by the low conductivity of the electrolyte and the large amount of slimes produced. Furthermore, it is very difficult to treat these slimes to separate and recover the various metals contained therein. These slimes also interfere with the operation of the cell and in addition carry considerable quantities of copper down with them.

Among the objects of the present invention are the provision of an effective and economical method of refining low grade copper bearing materials to obtain the principal constituents thereof in usable forms and the provision of electrolytic processes for separation of metals such as copper, lead, tin and zinc without the production of large amounts of slimes.

This application is a continuation in part of copending application Serial No. 91,298, filed July 18, 1936, by the present inventor, and upon which United States Patent 2,111,575 was issued on March 22, 1938.

In accordance with one embodiment of the invention anodes, consisting of low grade copper material containing relatively large amounts of lead, tin, zinc and the like together with smaller amounts of other metallic impurities such as arsenic, antimony, iron, nickel, etc., may be electrolyzed for the production of pure copper cathodes in a bath free from sulphuric acid or sulphates or halogen compounds other than chloro-sulphonic acids and having one of the aromatic sulphonic acids or one of the related chloro-sulphonic or nitro-sulphonic acids of aromatic hydrocarbons, as the principal active electrolytic agent, e. g. phenol-sulphonic acid, benzene disulphonic acid, or the like.

In all cases of such electrolysis it is possible to obtain cathodes of substantially pure copper, free from any of the originally admixed metals.

The resulting liquor then may contain lead, tin and copper in amounts of roughly the same order together with other impurities in smaller amounts. The bulk of the remaining copper may be removed by electrolysis with insoluble anodes and the rest of the copper by "cementing" or direct replacement with metallic tin or lead or both.

The now copper free liquor may then be electrolyzed to deposit out the tin or lead or both simultaneously (if both are present) as electrolytic solder, and thus the bulk of the original content of copper, tin and lead is recovered in useful forms.

After this removal of tin and lead, the liquor may be evaporated to remove the greater portion of its metallic salts content by crystallization and the resulting strong acid returned to the beginning of the process to re-enter the sulphonic acid electrolyte, while the salts comprising chiefly sulphonates of zinc and nickel are worked up to separate and recover these metals by any suitable method as well as to recover the sulphonic acid for return to the process.

The above described and other objects and features of the invention will be more apparent from the following detailed description thereof taken in conjunction with the accompanying drawings, in which Fig. 1 is a diagrammatic and skeleton flow sheet of a process embodying the invention;

Fig. 2 is a similar flow sheet of another form; and

Fig. 3 is a similar flow sheet of a third form.

In one specific embodiment of the invention, impure copper bearing materials from any suitable sources are charged into a blast furnace along with limestone and coke and the material is smelted to eliminate most of the iron in the form of a slag. The slag, which will also carry with it a portion of the zinc found in the material, is discarded. Some of the zinc is volatilized in the blast furnace and may be recovered, if desired.

The copper bearing materials charged into the blast furnace may be of varied types and compositions. The charge may comprise junked electrical apparatus containing brass, bronze, iron, copper, lead, solder, german silver, chromium, nickel, aluminum, zinc, and various non-metallic materials, principally insulating materials, such as rubber, porcelain, wood, slate, phenol plastics, silk, cotton, paper, cellulose esters, lacquers, enamels, etc. The charge may also include or consist of other copper bearing scraps and junked materials, machine shop sweepings, and miscellaneous refinery and foundry scraps, slags, ashes, etc. Typical materials suitable for use in this process might contain from about 10 to 60% copper, 0.5 to 20% tin, .5 to 20% lead, and the balance principally iron, zinc, and non-metallic materials. The process is also applicable to the refining of materials which are free from either lead or tin, although most materials of the type described contain both of these metals.

In the blast furnace, the combustible materials in the charge will be consumed, while some of the metallic impurities, such as chromium and aluminum, will be substantially eliminated in the slag. Other metallic impurities, for example, nickel, will enter the pig metal produced in the blast furnace, but they will not interfere with the subsequent operations.

The pig metal taken from the blast furnace contains practically all of the copper, tin and lead and a substantial part of the zinc found in the original material. This metal is transferred in the molten state directly to an oil fired converter, or it may be cast into pigs which are stored and later melted and charged into the converter. In the converter, some silica is added and substantially the remainder of the zinc is removed from the metal by blowing air therethrough. Since iron and zinc both oxidized more readily than do lead and tin, and zinc is more volatile than lead and tin, the iron and zinc will be removed first from the metal in the converter either as oxides which enter the converter slag or, in the case of zinc, as a vapor which oxidizes very readily into zinc fume. Consequently, the converter charge is blown until the zinc is substantally all eliminated either as fume, or in the slag, and the process is stopped before much of the lead and tin is removed. The point in the process where the zinc is almost completely exhausted and the lead and tin begin to be removed from the metal may be determined by watching the flame at the mouth of the converter, since a noticeable change in the appearance of the flame takes place at this point. Other means of determining this point may, of course, be used if desired. The zinc oxide fumes produced in the blast furnace and converter are conveyed to a bag house where they are collected in the form of a dust consisting principally of zinc oxide, which may be sold as such. The slag formed in the converter, which contains the iron and a substantial portion of the zinc formerly found in the metal charged into the converter, is removed after the metal has been blown, and is returned to the blast furnace.

The blown converter metal is cast directly into anodes which consist principally of copper, tin and lead, but which may contain minor quantities of such metals as zinc, antimony, nickel and iron. These anodes are then electrolyzed for the production of electrolytic copper cathodes in an electrolyte which will form soluble salts of copper, lead and tin. Anodes produced by treating junked telephone equipment might contain from 70 to 95% copper, .5 to 15% tin, .5 to 15% lead, and the remainder a mixture of small amounts of other metals. A typical anode obtained from materials of the type referred to above comprised substantially 90% copper, 3.5% tin, 5% lead, .5% zinc, and the remainder other metals, such as antimony, nickel and iron.

It will, of course, be obvious that if the original material to be refined is substantially free from either iron or zinc, the step employing the blast furnace or the converter will be omitted, and likewise that both of these operations will be unnecessary if both iron and zinc are substantially absent. The invention is also not limited to the removal of the iron and zinc by smelting in a blast furnace and blowing in a converter, as described. Any convenient methods well known in the art may be used to eliminate the iron and zinc, provided they do not remove the copper, lead and tin in sufficient quantities to render the process uneconomical. For example, the scrap material may be charged into a reverberatory furnace, and the iron removed by liquation or as a slag, while the zinc is removed as a slag and/or a fume. This procedure is particularly applicable when the scrap material is relatively free from inert and non-metallic materials. In any event, the material, either purified or in its original state, is cast into anodes when it consists essentially of copper, lead and tin.

Among the materials which are particularly suitable for use as electrolytes in the refining of the anode metal are the aromatic sulphonic acids and very satisfactory results may be obtained by employing a sulphonic acid such as phenol sulphonic acid or benzene disulphonic acid in which copper, lead, tin, zinc, iron and nickel are all soluble. The various chloro-sulphonic and nitro-sulphonic acids may also be applied to this use. It is furthermore found that, especially when lead is present, an absence of any appreciable amount of sulphuric acid or of sulphates is preferable.

In carrying out one process embodying the present invention, an electrolytic bath is made up containing about 350 to 500 grams of benzene disulphonic acid per liter. Copper is then dissolved into this solution, preferably electrolytically, until 9 to 50 grams per liter of copper ar present. The free acid in the bath will then range from 290 to 410 grams per liter. The above has been found to be a satisfactory and simple method of preparing a bath according to the present invention, but other methods which have substantially the same resulting product may well be used, e. g. dissolving 290 to 410 grams per liter of the acid and a sufficient quantity of previously prepared copper salt of the acid to provide 9 to 50 grams of copper per liter.

Anodes for use in such a bath may typically consist principally of copper containing tin and lead as primary impurities but which may also include smaller amounts of nickel, zinc, arsenic, antimony, iron, etc.

Such anodes are electrolyzed in the bath described, preferably using copper starting sheets as cathodes. Preferably, the electrolyte is circulated during the electrolysis, although rotating anodes or cathodes or the like means, such as stirrers, may also be used, and, also preferably, the temperature of the bath will be maintained at from 60° to 82° C., although the procedure operates satisfactorily under some conditions within the range of from 40° to 90° C. or even beyond this.

Depending somewhat upon the composition of the anodes actually used at any given time, as well as upon the composition of the bath, and also conditions of temperature, the current density will preferably run from 8 to 25 amperes per square foot, and the cell voltage from 0.15 to 0.35 volt.

In a given illustrative instance in which the procedure shown in Fig. 1 may be followed, an electrolyte containing no oxidizing agents and nickel free crude anodes may be used. The following is a typical anode composition, the weight used being 2128 lbs.

*Type I*

| | Per cent |
|---|---|
| Copper | 86.0 |
| Lead | 7.0 |
| Tin | 5.0 |
| Arsenic | 0.1 |
| Antimony | 0.2 |
| Iron | 0.1 |
| Nickel | 0.0 |
| Zinc | 1.0 |

The copper cathodes produced are substantially pure metallic copper of the usual high grade commercially termed "electrolytic copper," and weigh about 2000 lbs. Anode slimes are produced, amounting, when separated from the solution and dried, to about 115 lbs. or about 5.75% of the weight of the crude anodes consumed. Upon analysis, the metal content of these is found to be about

| | Per cent |
|---|---|
| Copper | 43.0 |
| Tin | 17.4 |
| Lead | 6.5 |
| Antimony | 4.0 |

These slimes are disposed of substantially in a manner hereinafter described.

The foul electrolyte after this step should show a metal content of about

| | Grams per liter |
|---|---|
| Copper | 16 |
| Lead | 28 |
| Tin | 16 |
| Zinc | 8 |
| Free acid | 300 |

A portion of this liquor is removed and replaced with fresh solution, and this liquor is treated electrolytically with insoluble anodes to remove copper down to about the point where other metals would begin to deposit, thus producing a further relatively small amount (about 70 lbs.) of copper. The liquor is then treated with tin to deposit out copper by replacement and to reduce stannic tin in the solution to the stannous form. This produces roughly 20 lbs. of copper "cement" which could be returned to the production of crude anodes or roasted and used in the preparation of electrolytic solution for the first step.

The resultant liquor is substantially copper free and contains about

| | Grams per liter |
|---|---|
| Lead | 28.0 |
| Tin | 34.0 |
| Zinc | 8.0 |

This is then electrolyzed with insoluble anodes to deposit the lead and tin together as electrolytic solder and produces some 310 lbs. of solder showing about 45% lead and 55% tin.

The original crude anodes being thought of as substantially free from nickel, the liquor now to be considered is practically a solution only of zinc sulphonate and free sulphonic acid. This may be concentrated by evaporation to crystallize out the zinc sulphonate. The mother liquor may be returned to the preparation of electrolyte. The zinc salt may be re-crystallized if necessary, dissolved, and treated with lime, thus precipitating the zinc out as hydroxide. The calcium sulphonate solution upon treatment with a quantitative amount of sulphuric acid to precipitate the calcium as calcium sulphate yields free sulphonic acid to be returned to the cycle. The zinc is recovered from the hydroxide by leaching with caustic soda and electrolysis of the sodium zincate solution.

The original electrolyte may well be charged with copper by using a relatively high grade copper scrap, clippings, turnings, punch scrap, scrap wire, or the like.

In this particular example, the original electrolysis of step 1 is done in an open topped tank, with the surface of the electrolyte exposed to the atmosphere, and with the electrolyte circulated, thus exposing all of the solution to the oxygen of the air. In the case of nickel free crude anodes like Type I, this exposure to the air is usually unimportant. If there is nickel present and the air is given free access to the circulated electrolyte in step 1, the procedure changes materially in the effected results, as will appear from the following illustrative procedure, which also follows the general outline of Fig. 1.

In this instance the crude anodes may be thought of as generally like Type I, but comprising also some nickel. For example, the following composition will be termed Type II.

*II*

| | Per cent |
|---|---|
| Copper | 86.0 |
| Lead | 7.0 |
| Tin | 5.0 |
| Arsenic | 0.1 |
| Antimony | 0.2 |
| Iron | 0.1 |
| Nickel | 0.25 |
| Zinc | 1.0 |

Except as instanced below, the process and its results are substantially the same as those described above for the treatment of crude anodes of type I. In step 1, the first electrolysis of the crude anodes in the sulphonic acid electrolyte, it is found that by far the greater portion of the anodically dissolved tin precipitates out of solution and is to be found in the anode slimes. The foul electrolyte will show a metal content such as

| | Grams per liter |
|---|---|
| Copper | 16 |
| Lead | 28 |
| Tin | 2 |
| Nickel | 2 |
| Zinc | 8 |
| Free acid | 300 |

The anode slimes of step 1, on the other hand, amount to about 12% of the weight of the anodes consumed, or twice as much as in the case of Type I, and show a metal content such as the following:

| | Per cent |
|---|---|
| Copper | 20 |
| Tin | 41 |
| Lead | 3 |
| Antimony | 2 |

Thus, with no nickel or oxygen containing oxidizing agent present (type I), the bulk of the tin remains dissolved in the electrolyte and accompanies the lead through step 3 to be recovered, without separation from the lead, as electrolytic solder, while with nickel present and the bath exposed to the air 90% or more of the anodically dissolved tin from the crude anodes goes into the anode slimes and the lead continues on as before.

Hence in step 2, although tin, lead or solder may be used to cement out the residual copper, it may be preferred to use only lead with the result that at step 3, the cathodes produced are principally lead, running in some cases upward of 95% lead and the small balance tin. In fact, experimental work shows that in some cases at least, proper balancing of conditions in step 1 will result in driving practically all of the tin into the slimes, thus effecting a substantially clean separation in one step at this stage of the lead and tin from each other, tin into the slimes, and lead into the electrolyte.

Also in the process now being considered, it may be preferable to prepare the original electrolyte for step 1 with a certain minimum content of nickel necessary to act from the beginning of the electrolysis as a catalyte to effect the oxidation and precipitation of the tin as soon as its anodic solution begins. To this end the electrolyte will be compounded to contain sulphonic acid and copper sulphonate as already described, and will also have enough nickel introduced, by anodic solution of metallic nickel or by solution of nickel sulphonate or otherwise, to effect in the electrolyte a content of enough nickel to give the desired effect, in the present instance about 2 grams per liter.

It is found that if access of air to the bath in step 1 is prevented, as by floating a thick layer (one or more inches) of oil on the surface, the effect of the nickel is partly inhibited, and nickel bearing anodes such as type II can be treated according to the scheme described above for the treatment of nickel free material such as anodes of type I. Then, however, the amount of tin in the slimes is greater than when nickel is absent.

If it be desired to separate the tin cleanly, in the absence of nickel to oxidize the tin catalytically, this may be accomplished by adding to the bath a direct oxidizing agent which will not effect the procedure injuriously in other respects. Thus hydrogen peroxide will give a substantially quantitative precipitation of the tin in the slimes, as will also barium peroxide, lead peroxide, and other suitable agents. The decomposition product of hydrogen peroxide is water, which helps to offset evaporation from the bath. The lead from lead peroxide accompanies the anodic lead and is removed at step 3. Barium from barium peroxide will continue, inertly so far as the process is concerned, in the liquor, to mix with the calcium waste at the end.

In the procedure of Fig. 1 and in the absence of nickel, this may well be done between steps 1 and 2 or between steps 2 and 3, by adding substantially the theoretically quantitative amount of a suitable solution, for example, of hydrogen peroxide, required to precipitate the tin present in the form of metastannic acid. In such case, of course, only lead and not tin will be used to cement out copper in step 2 and the cathodes produced in step 3 will be substantially pure lead and not a solder or lead-tin alloy.

If the procedure of step 1 of Fig. 1 be carried out in the presence of nickel but in the absence of air, as by blanketing the surface of the bath with inert oil, obviously tin may be removed, as just described, between steps 1 and 2 or between steps 2 and 3, by means of an oxidizing agent.

Also if, when nickel is present and air is admitted to drive tin into the slimes, it is desired to produce substantially pure lead cathodes at step 3 instead of low tin solders, the residual tin in the solution after copper is cemented out with lead in step 2 may be precipitated as described. Or oxidizing agent may be added to the bath originally.

A somewhat different procedure embodying the invention is that of Fig. 2. Here anodes of either type are electrolyzed as in either of the several above described procedures in step 1, and the anode slimes separated for treatment as hereinafter described.

The foul electrolyte containing some copper, lead, tin, zinc and minor amounts of other metals is treated with the quantitative amount of sulphuric acid required to precipitate all the lead as lead sulphate. This is removed from the liquor to be disposed of as such or to be worked up in any suitable manner to recover the lead as metal.

The resulting liquor may then be electrolyzed with insoluble anodes to free the solution of residual copper and tin, the cathodes and sludge produced here being returned to the production of crude copper anodes, while the liquor is precipitated with lime. Zinc is leached from the precipitated hydroxide with caustic soda and recovered as before. The calcium sulphonate solution is worked up to recover sulphonic acid. Nickel is recovered from the soda leached residues in any suitable manner.

In this procedure also, it may be preferred to separate tin, as described above, by precipitation as metastannic acid with an oxidizing agent such as hydrogen peroxide. This may be conveniently done in the manner described between steps 1 and 2 or between steps 2 and 3.

In the parent application mentioned above, of which the present is a continuation in part, there is disclosed a variety of sulphonic, chloro-sulphonic and nitro-sulphonic acids and the like, which are suitable for use as electrolytes for the separation of metals, substantially in the manner herein described, whereas in the above description of the present application only benzene disulphonic acid is specified. Benzene disulphonic acid is at present the preferred member of the class of electrolytes mentioned, but the above procedures are not intended to be limited to the use of this acid alone. The specific procedures are illustrative only and will require no essential alteration or modification in case another of the electrolytes in question is used in place of benzene disulphonic acid.

In each of the above procedures, the first step of electrolyzing the crude copper anodes in the sulphonic acid electrolyte produced an amount of anode slimes which was merely set aside for future consideration. These are now to be taken up and the treatment of them described according to the procedure diagrammatically outlined in Fig. 3.

The anode slimes from step I of either Fig. 1 or Fig. 2 are removed at suitable intervals from the electrolytic cells of step I. The collected slimes are washed, dried, roasted to oxidize the copper content, and leached with benzene disulphonic acid to remove the copper. The leachings and washings are returned to the cells of step I of Figs. 1 or 2 or are used to make up fresh solutions.

The leached residues are smelted to metal in any approved manner and furnace and are cast into anodes, which in one illustrative instance showed the following composition upon analysis:

| | Per cent |
|---|---|
| Tin | 80 |
| Lead | 13 |
| Antimony | 4 |
| Copper | 2 |
| Other admixtures | 1 |

For the electrolysis of such materials it is preferable to use phenol sulphonic acid free from sulphuric acid and sulphates although benzene disulphonic acid is also suitable. In practice, the phenol sulphonic acid employed may be the purified product of the direct sulphonation of phenol, containing a mixture of mono and disulphonated phenol with perhaps small amounts of even higher sulphonation products, and in which may be present any one or two or all three of the di-acids. A preferred bath for this electrolysis will contain from about 150 to about 350 grams per liter of the phenol sulphonic acid. The bath is improved for the production of good cathodes by the addition of such agents as glue, resorcinol or the like. In one instance the addition to the bath of from about 0.075 to about 0.10 gram per liter each of glue and resorcinol was found to improve materially the mechanical quality of the cathodes.

This electrolysis produces substantially pure cathodes of tin, solder or lead according to the composition of the anodes used, in which tin or lead may vary from nothing to over 80%. In installation in localities where power is relatively costly, it is preferable that the anodes contain not over about 12% of antimony, copper and other admixtures taken together. The process can be successfully operated when power is cheap with anodes containing as much as 40% of these materials but only at the cost of excessive cell voltages and eventual electrode polarization. Substantially all of the antimony, copper and other admixtures, together with some tin and lead, comes out as anode slimes which may be treated in any suitable manner to recover their components.

While this procedure, diagrammed in Fig. 3, is described as applied to the anode slimes of step I in Figs. 1 and 2, it is obviously not confined to such slimes as a starting point, but may be applied as an independent procedure to materials of suitable compositions derived from any source. For example, such a procedure may be of value in the treatment of such materials as scrap solder, lead alloy cable sheath scrap, and the like.

The aromatic sulphonic acids are preferably used in the electrolyte in carrying out the electrolytic steps in the refining process embodying the invention for several reasons. In the first place, they dissolve not only the copper but also the lead and tin. In addition, they have a high conductivity, they are relatively non-volatile, and are not appreciably decomposed electrolytically. They, therefore, permit the electrolytic deposition of pure copper without the precipitation of substantial quantities of the lead and tin as slimes. Their high conductivity lowers the power consumption and their stability makes them economical to use because they may be recovered and reused.

Among the aromatic sulphonic acids which may be employed are the mono and poly sulphonic acids of phenol, benzol (benzene), tuluol (tuluene), the cresols, the xylenes, the xylenols, naphthalene, the naphthols, anthracene, phenanthrene, and related compounds. The related chloro and nitro sulphonic acids of aromatic hydrocarbons may, likewise, be used. In addition, satisfactory results may be obtained by using the sulphonic acids of aliphatic compounds like methane, ethane, propane, etc. Mixtures of these acids may, of course, be used if desired.

Since the acids mentioned above dissolve copper, lead and tin, it is obvious that the invention may be practised to refine copper bearing metals that include either one or both of lead and tin. For example, scrap brasses may contain no tin, while bronzes may be free from lead. These materials may be carried through the refining steps described in the same manner that is employed for materials containing both lead and tin, the only difference being that the products obtained would not include lead or tin, as the case may be.

It may further be noted that in the procedures where no direct oxidizing agent, e. g. hydrogen peroxide, or catalytic oxidizing agent, e. g., nickel, is used, and it is desired to keep the production of anode slimes to a minimum, especially as regards those due to tin, it may be of advantage to use an inert oil to blanket the surface of the bath and thus prevent access of atmospheric oxygen to the bath. Since the bath may be strongly agitated by a circulation pump, stirrers, moving electrodes or the like, this oil cover may need to be comparatively thick, e. g. one or two inches or more. Oils suitable for this purpose are, for example, the refined mineral oils like that ordinarily sold for medicinal purposes under the trade name "Nujol."

Where the phrase "benzene disulphonic acid" is used, it is thought of as standing for any one, two or all three of the several isomers, viz. the para-, meta-, and ortho- benzene disulphonic acids. In ordinary practise, however, a commercially obtainable acid is used which appears to have the meta- benzene disulphonic acid as its principal constituent with admixtures in varying total and relative proportions of the para and ortho forms.

In operations according to the several procedures outlined in connection with Figs. 1 and 2, in step I, in view of the fact that neither the lead nor the tin is deposited at the cathode, these metals will gradually increase in concentration in the electrolyte and will eventually render the electrolyte ineffective for the deposition of pure copper. Consequently, a portion of the solution is removed from time to time and the lead and tin present therein are removed. The ensuing steps 2, 3 etc., are to be thought of ordinarily as carried out upon these removed portions of the electrolyte of step I. In this manner the processes in question are made continuous, for the copper content is kept constant in the electrolyte of step I and sufficiently high so that only copper is deposited on the cathodes in this step, the constantly increasing content of metals of the group consisting of lead and tin and zinc being periodically brought down by this replacement of portions of the foul electrolyte with fresh solution. Thus, ordinarily, in the drawings as well as in the specification, the phrase "foul electrolyte" is intended to mean such withdrawn portions of the electrolyte of step I. If desired, however, these procedures can be operated in batch fashion, wherein, when the electrolyte of step I becomes too loaded with other metals to effect deposition of pure copper, the entire volume is transferred to step 2 and replaced by fresh solution for step I.

The molecular or atomic mechanics of the actions of nickel in effecting increased precipitation of tin in the anode slimes of Fig. 1 is not as yet clearly understood. It behaves, however, as if it were a carrier or catalyte to effect oxidation of tin with oxygen from the air. In this application, the phrases "catalytic agent," "catalytic oxidation agent" and the like are to be taken to mean substances which effect this oxidation in the manner that nickel does and which themselves contain no oxygen, whereas phrases like "chemical agent," "chemical oxidizing agent," "direct oxidizing agent" and the like are to be taken to mean oxygen bearing oxydants such as hydrogen peroxide, barium peroxide, lead peroxide and the like.

In step I of Figs. 2 and 3, when nickel is present in the crude anodes and the process is started with a nickel free electrolyte, nickel will build up in the solution and begin an increasing catalytic effect. If it be desired to throw out tin in the anode slimes, this may obviously be accomplished by adding diminishing amounts of direct oxidizing agent from the beginning (e. g. hydrogen peroxide) until the nickel is sufficiently built up to act alone.

It will be clear from the foregoing that a principal feature of the present invention is the discovery that in such electrolytic baths as are described hereinabove, the anodically dissolved tin may be caused to divide itself in substantially any desired ratio between dissolved tin remaining in the bath and tin precipitated as anodic slimes, while the lead remains in solution. This is accomplished by maintaining in the bath a predetermined degree of oxidizing effect which can be created and maintained by addition of catalytic oxidizing agent, by addition of chemical oxidizing agent, or by any convenient combination of these agencies.

From the foregoing description, it is apparent that the invention provides simple, effective and economical processes for refining non-ferrous metals. It also provides new and improved electrolytes and electrolytic processes for the separation of metals, including copper, lead and tin. Various modifications and changes may, of course, be made to adapt the invention to varying conditions. Hence, the invention is not limited to the specific embodiments described herein, but embraces all modifications and equivalents falling within the scope of the annexed claims.

What is claimed is:

1. The method of separating metals from tin-containing metallic materials consisting principally of copper, which comprises electrolyzing anodes of such a material in a bath having a sulphonic acid as principal electrolytic agent to deposit substantially pure copper, and causing an oxygen-bearing oxidizing agent tending to promote precipitation of tin as anode slimes to be present in the bath during the electrolysis in sufficient amount to effect the precipitation as anode slimes of a material quantity of tin which would otherwise be held in solution.

2. The method of separating metals from tin-containing metallic materials consisting principally of copper, which comprises electrolyzing anodes of such a material in a bath having an aromatic sulphonic acid as principal electrolytic agent to deposit substantially pure copper, and causing hydrogen peroxide to be present in the bath during the electrolysis in sufficient amount to effect the precipitation as anode slimes of a material quantity of tin which would otherwise be held in solution.

3. The method of separating metals from tin-containing metallic materials consisting principally of copper, which comprises electrolyzing anodes of such a material in a bath having an aromatic sulphonic acid as principal electrolytic agent to deposit substantially pure copper, and causing lead peroxide to be present in the bath during the electrolysis in sufficient amount to effect the precipitation as anode slimes of a material quantity of tin which would otherwise be held in solution.

4. The method of separating metals from tin-containing metallic materials consisting principally of copper, which comprises electrolyzing anodes of such a material in a bath having benzene disulphonic acid as principal electrolytic agent to deposit substantially pure copper, and causing an oxygen-bearing oxidizing agent tending to promote precipitation of tin as anode slimes to be present in the bath during the electrolysis in sufficient amount to effect the precipitation as anode slimes of a material quantity of tin which would otherwise be held in solution.

5. The method of separating metals from metallic materials consisting principally of metal of the group consisting of tin and lead and containing copper as a substantial but minor constituent, which comprises forming anodes of such a material, and electrolyzing the anodes in a bath having at least 150 grams per liter of phenol sulphonic acid as principal electrolytic agent to deposit substantially pure metal of the group consisting of tin and lead.

6. The method of separating metals from metallic materials consisting principally of metal of the group consisting of tin and lead and containing up to about 12% of other admixtures including copper as a substantial constituent, which comprises forming anodes of such a material, and electrolyzing the anodes in a bath having from about 150 grams per liter to about 350 grams per liter of phenol sulphonic acid as principal electrolytic agent to deposit substantially pure metal of the group consisting of tin and lead.

7. The method of separating metals from metallic materials consisting principally of copper and containing metal of the group consisting of tin and lead, which comprises forming anodes from such a mixture, electrolyzing the anodes in a bath having benzene disulphonic acid as principal electrolytic agent to deposit substantially pure copper, preparing metallic anodes from the anode slimes produced, and electrolyzing the second named anodes in a bath having phenol sulphonic acid as principal electrolytic agent to deposit substantially pure metal of the group consisting of tin and lead.

8. The method of separating metals from tin-containing metallic materials consisting principally of copper, which comprises forming anodes of such a material, electrolyzing the anodes in a bath having from about 350 to about 500 grams per liter of the acid radical of benzene disulphonic acid as principal electrolytic agent to deposit substantially pure copper, and causing an oxygen-bearing oxidizing agent tending to promote precipitation of tin as anode slimes to be present in the bath during the electrolysis in sufficient amount to effect the precipitation as anode slimes of a material quantity of tin which would otherwise be held in solution.

9. The method of separating metals from tin-containing metallic materials consisting principally of copper, which comprises forming anodes of such a material, electrolyzing the anodes in a bath having from about 290 to about 410 grams per liter of free benzene disulphonic acid and from about 9 to about 50 grams per liter of dissolved copper as principal electrolytic agents to deposit substantially pure copper, causing an oxygen-bearing oxidizing agent tending to promote precipitation of tin as anode slimes to be present in the bath during the electrolysis, and regulating the concentration of the agent in the bath so as to maintain substantially throughout the electrolysis a predetermined ratio between tin precipitated as anodes slimes and tin dissolved in the bath, the tin precipitated as anode slimes comprising a material quantity of tin which would otherwise be held in solution.

10. The method of separating metals from tin-containing metallic materials consisting principally of copper, which comprises forming anodes of such a material, electrolyzing the anodes in a bath having an aromatic sulphonic acid as principal electrolytic agent to deposit substantially pure copper, causing an oxygen-bearing oxidizing agent tending to promote precipitation of tin as anode slimes to be present in the bath during the electrolysis, and regulating the concentration of the agent in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution.

11. The method of separating metals from tin-containing metallic materials consisting principally of copper, which comprises forming anodes of such a material, electrolyzing the anodes in a bath having an aromatic sulphonic acid as principal electrolytic agent to deposit substantialy pure copper, causing hydrogen peroxide to be present in the bath during the electrolysis to promote precipitation of tin as anode slimes, and regulating the concentration of the hydrogen peroxide in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution.

12. The method of separating metals from tin-containing metallic materials consisting principally of copper, which comprises forming anodes of such a material, electrolyzing the anodes in a bath having an aromatic sulphonic acid as principal electrolytic agent to deposit substantially pure copper, causing lead peroxide to be present in the bath during the electrolysis to promote precipitation of tin as anode slimes, and regulating the concentration of the lead peroxide in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution.

13. The method of separating metals from tin-containing metallic materials consisting principally of copper, which comprises forming anodes of such a material, electrolyzing the anodes in a bath having benzene disulphonic acid as principal electrolytic agent to deposit substantially pure copper, causing hydrogen peroxide to be present in the bath during the electrolysis to promote precipitation of tin as anode slimes, and regulating the concentration of the hydrogen peroxide in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution.

14. The method of separating metals from tin-containing metallic materials consisting principally of copper, which comprises forming anodes of such a material, electrolyzing the anodes in a bath having benzene disulphonic acid as principal electrolytic agent to deposit substantially pure copper, causing lead peroxide to be present in the bath during the electrolysis to promote precipitation of tin as anode slimes, and regulating the concentration of the lead peroxide in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution.

15. The method of separating metals from tin-containing metallic materials consisting principally of copper, which comprises forming anodes of such a material, electrolyzing the anodes in a bath having an aromatic sulphonic acid as principal electrolytic agent to deposit substantially pure copper, causing an oxygen-bearing oxidizing agent tending to promote precipitation of tin as anode slimes to be present in the bath during the electrolysis, and regulating the concentration of the agent in the bath so as to effect the maximum precipitation as anode slimes of tin which would otherwise be held in solution.

16. The method of separating metals from tin-containing metallic materials consisting principally of copper, which comprises forming anodes of such a material, electrolyzing the anodes in a bath having benzene disulphonic acid as principal electrolytic agent to deposit substantially pure copper, causing an oxygen-bearing oxidizing agent tending to promote precipitation of tin as anode slimes to be present in the bath during the electrolysis, and regulating the concentration of the agent in the bath so as to effect the maximum precipitation as anode slimes of tin which would otherwise be held in solution.

17. The method of separating metals from tin-containing metallic materials consisting principally of copper, which comprises forming anodes of such a material, electrolyzing the anodes in a bath having benzene disulphonic acid as principal electrolytic agent to deposit substantially pure copper, causing an oxygen-bearing oxidizing agent tending to promote precipitation of tin as anode slimes to be present in the bath during the electrolysis, and regulating the concentration of the agent in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution.

18. The method of separating metals from metallic materials consisting principally of copper and containing metal of the group consisting of tin and alloys of lead and tin, which comprises forming anodes of such a material, electrolyzing the anodes in a bath having benzene disulphonic acid as principal electrolytic agent to deposit substantially pure copper, causing an oxygen-bearing oxidizing agent tending to promote precipitation of tin as anode slimes to be present in the bath during the electrolysis in sufficient amount to effect the precipitation as anode slimes of a material quantity of tin which otherwise would be held in solution, forming metallic anodes from the anode slimes, and electrolyzing the last named anodes in a bath having phenol sulphonic acid as principal electrolytic agent to deposit tin substantially free from any admixture except lead.

19. The method of separating metals from metallic materials consisting principally of copper and containing metal of the group consisting of tin and alloys of lead and tin, which comprises forming anodes of such a material, electrolyzing the anodes in a bath having benzene disulphonic acid as principal electrolytic agent to deposit substantially pure copper, causing an oxygen-bearing oxidizing agent tending to promote precipitation of tin as anode slimes to be present in the bath during the electrolysis, regulating the concentration of the agent in the bath so as to maintain substantially throughout the electrolysis a predetermined ratio between tin precipitated as anode slimes and tin dissolved in the bath, the tin precipitated as anode slimes comprising a material quantity of tin which would otherwise be held in solution, forming metallic anodes from the anode slimes, and electrolyzing the last named anodes in a bath having phenol sulphonic acid as principal electrolytic agent to deposit tin substantially free from any admixture except lead.

JAMES R. STACK.